(12) United States Patent
Namuduri et al.

(10) Patent No.: US 12,658,727 B2
(45) Date of Patent: Jun. 16, 2026

(54) VEHICLE CHARGING USING A MULTI-FUNCTIONAL INVERTER SYSTEM

(71) Applicant: GM GLOBAL TECHNOLOGY OPERATIONS LLC, Detroit, MI (US)

(72) Inventors: Chandra S. Namuduri, Troy, MI (US); Rashmi Prasad, Troy, MI (US); Goro Tamai, Bloomfield Hills, MI (US); Minh-Khai Nguyen, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 838 days.

(21) Appl. No.: 18/074,231

(22) Filed: Dec. 2, 2022

(65) Prior Publication Data

US 2024/0186811 A1 Jun. 6, 2024

(51) Int. Cl.
| | |
|---|---|
| *H02J 7/90* | (2026.01) |
| *B60L 50/51* | (2019.01) |
| *B60L 50/60* | (2019.01) |
| *H02J 7/50* | (2026.01) |
| *H02M 3/158* | (2006.01) |
| *H02M 7/537* | (2006.01) |

(52) U.S. Cl.
CPC .............. *H02J 7/927* (2026.01); *B60L 50/51* (2019.02); *B60L 50/60* (2019.02); *H02J 7/575* (2026.01); *H02J 7/90* (2026.01); *H02M 3/1582* (2013.01); *H02M 7/537* (2013.01); *B60L 2210/12* (2013.01); *B60L 2210/14* (2013.01); *B60L 2210/40* (2013.01)

(58) Field of Classification Search
CPC ..................................................... H02J 7/00711
USPC .......................................................... 320/107
See application file for complete search history.

(56) References Cited

U.S. PATENT DOCUMENTS

| | | | |
|---|---|---|---|
| 11,569,745 B2 * | 1/2023 | Prasad ................ | H02M 3/1586 |
| 12,240,345 B1 * | 3/2025 | Xu ........................... | B60L 58/20 |
| 2021/0001738 A1 * | 1/2021 | Youn ....................... | B60L 15/20 |

FOREIGN PATENT DOCUMENTS

DE 102021106681 A1 * 2/2022 ............. H02J 7/342

* cited by examiner

*Primary Examiner* — Jerry D Robbins
(74) *Attorney, Agent, or Firm* — CANTOR COLBURN LLP

(57) ABSTRACT

A charging system of a vehicle includes an inverter of a propulsion system, the inverter connected to an electric motor and a battery system of the vehicle, and a switching assembly including a plurality of switches. The charging system also includes a controller configured to control the switching assembly to connect the inverter and the electric motor to a charge port of the vehicle and define a conversion circuit including one or more inverter switches and the electric motor by selectively connecting the charge port to the inverter or the electric motor and selectively connecting the battery system to the electric motor by the switching assembly. The controller is configured to operate the conversion circuit to adjust at least one of an input voltage for charging the battery system from a power source, and an output voltage for discharging the battery system to charge an external energy storage system.

20 Claims, 7 Drawing Sheets

VEHICLE CHARGING USING A
MULTI-FUNCTIONAL INVERTER SYSTEM

The subject disclosure relates to vehicles, and more specifically, to supplying electrical energy from a vehicle.

Vehicles, including gasoline and diesel power vehicles, as well as electric and hybrid electric vehicles, feature battery storage for purposes such as powering electric motors, electronics and other vehicle subsystems. Various charging systems are available, including charging stations (e.g., conventional and fast charging stations), charging systems in residences and commercial buildings, and vehicle-to-vehicle (V2V) charging. In some cases, the battery voltage between a vehicle that provides power and the vehicle being charged is different, which can limit the availability of charging options. Accordingly, it is desirable to provide a device or system that can provide charging capability that supports energy exchange between energy storage systems having dissimilar voltage characteristics.

SUMMARY

In one exemplary embodiment, a charging system of a vehicle includes an inverter of a propulsion system of the vehicle, the inverter connected to an electric motor and a battery system of the vehicle, and a switching assembly including a plurality of switches. The charging system also includes a controller configured to control the switching assembly to connect the inverter and the electric motor to a charge port of the vehicle and define a conversion circuit including one or more inverter switches and the electric motor by selectively connecting the charge port to the inverter or the electric motor and selectively connecting the battery system to the electric motor by the switching assembly. The controller is configured to operate the conversion circuit to adjust at least one of an input voltage for charging the battery system from a power source, and an output voltage for discharging the battery system to charge an external energy storage system.

In addition to one or more of the features described herein, the controller is configured to adjust the input voltage to conform the input voltage to a battery voltage of the battery system, and adjust the output voltage to conform the output voltage to a voltage of the external energy storage system.

In addition to one or more of the features described herein, the controller is configured to operate the conversion circuit as a boost circuit by controlling a set of lower inverter switches, and operate the conversion circuit as a buck converter by controlling a set of upper inverter switches.

In addition to one or more of the features described herein, the battery system and the inverter are connected in parallel to a propulsion bus, the switching assembly includes a positive charge port switch configured to selectively connect a positive charge port terminal to the propulsion bus and a negative charge port switch configured to selectively connect a negative charge port terminal to the propulsion bus, a first switch configured to selectively connect the positive charge port terminal to the electric motor, a second switch configured to selectively connect the positive charge port terminal to the inverter, and a third switch configured to selectively connect the battery system to the electric motor, and the controller is configured to control one or more of the first switch, the second switch and the third switch to put the charging system into a selected charging mode.

In addition to one or more of the features described herein, the controller is configured to put the charging system into a first charging state in which the positive charge port switch is open, the negative charge port switch is closed, the first switch is closed, the second switch is open, and the third switch is open, the controller configured to control the charging system in at least one of a boost charging mode by operating the conversion circuit as a boost converter, and a buck discharging mode by operating the conversion circuit as a buck converter.

In addition to one or more of the features described herein, the controller is configured to put the charging system into a second charging state in which the positive charge port switch is open, the negative charge port switch is closed, the first switch is open, the second switch is closed, and the third switch is closed, the controller configured to control the charging system in at least one of a buck charging mode by operating the conversion circuit as a buck converter, and a boost discharging mode by operating the conversion circuit as a boost converter.

In addition to one or more of the features described herein, the vehicle includes at least one accessory connected to the propulsion bus in parallel with the inverter and the battery system.

In addition to one or more of the features described herein, the controller is configured to control the switching assembly to connect the at least one accessory by a fourth switch to the battery system and supply power to the at least one accessory during at least one of the charging and the discharging.

In one exemplary embodiment, a method of controlling a charging system of a vehicle includes receiving a request to charge a battery system of the vehicle from a power source, or a request to discharge the battery system to charge an external energy storage system, the vehicle including a propulsion system having an inverter connected to an electric motor and the battery system of the vehicle. The method also includes determining charging parameters including a battery system voltage, and a voltage of the power source or external energy storage system, and controlling a switching assembly including a plurality of switches to connect the inverter and the electric motor to a charge port of the vehicle, and defining a conversion circuit including one or more inverter switches and the electric motor by selectively connecting the charge port to the inverter or the electric motor and selectively connecting the battery system to the electric motor by the switching assembly. The method further includes operating the conversion circuit to adjust an input voltage for charging the battery system from the power source, or an output voltage for discharging the battery system to charge the external energy storage system.

In addition to one or more of the features described herein, the conversion circuit is operated as a boost circuit by controlling a set of lower inverter switches, and is operated as a buck converter by controlling a set of upper inverter switches.

In addition to one or more of the features described herein, the battery system and the inverter are connected in parallel to a propulsion bus, the switching assembly includes a positive charge port switch configured to selectively connect a positive charge port terminal to the propulsion bus and a negative charge port switch configured to selectively connect a negative charge port terminal to the propulsion bus, a first switch configured to selectively connect the positive charge port terminal to the electric motor, a second switch configured to selectively connect the positive charge port terminal to the inverter, and a third switch configured to selectively connect the battery system to the electric motor, and controlling the switching assembly includes controlling one or more of the first switch, the second switch and the third switch to put the charging system into a selected charging mode.

In addition to one or more of the features described herein, controlling the switching assembly includes putting the charging system into a first charging state in which the positive charge port switch is open, the negative charge port switch is closed, the first switch is closed, the second switch is open, and the third switch is open, and controlling the charging system in at least one of a boost charging mode by operating the conversion circuit as a boost converter, and a buck discharging mode by operating the conversion circuit as a buck converter.

In addition to one or more of the features described herein, controlling the switching assembly includes putting the charging system into a second charging state in which the positive charge port switch is open, the negative charge port switch is closed, the first switch is open, the second switch is closed, and the third switch is closed, and controlling the charging system in at least one of a buck charging mode by operating the conversion circuit as a buck converter, and a boost discharging mode by operating the conversion circuit as a boost converter.

In addition to one or more of the features described herein, the vehicle includes at least one accessory connected to the propulsion bus in parallel with the inverter and the battery system, and controlling the switching assembly includes connecting the at least one accessory by a fourth switch to the battery system and supplying power to the at least one accessory during at least one of the charging and the discharging.

In one exemplary embodiment, a vehicle system includes a memory having computer readable instructions, and a processing device for executing the computer readable instructions, the computer readable instructions controlling the processing device to perform a method. The method includes receiving a request to charge a battery system of the vehicle from a power source, or a request to discharge the battery system to charge an external energy storage system, the vehicle including a propulsion system having an inverter connected to an electric motor and the battery system of the vehicle. The method also includes determining charging parameters including a battery system voltage, and a voltage of the power source or external energy storage system, controlling a switching assembly including a plurality of switches to connect the inverter and the electric motor to a charge port of the vehicle, and defining a conversion circuit including one or more inverter switches and the electric motor by selectively connecting the charge port to the inverter or the electric motor and selectively connecting the battery system to the electric motor by the switching assembly. The method further includes operating the conversion circuit to adjust an input voltage for charging the battery system from the power source, or an output voltage for discharging the battery system to charge the external energy storage system.

In addition to one or more of the features described herein, the conversion circuit is operated as a boost circuit by controlling a set of lower inverter switches, and is operated as a buck converter by controlling a set of upper inverter switches.

In addition to one or more of the features described herein, the battery system and the inverter are connected in parallel to a propulsion bus, the switching assembly includes a positive charge port switch configured to selectively connect a positive charge port terminal to the propulsion bus and a negative charge port switch configured to selectively connect a negative charge port terminal to the propulsion bus, a first switch configured to selectively connect the positive charge port terminal to the electric motor, a second switch configured to selectively connect the positive charge port terminal to the inverter, and a third switch configured to selectively connect the battery system to the electric motor, and controlling the switching assembly includes controlling one or more of the first switch, the second switch and the third switch to put the charging system into a selected charging mode.

In addition to one or more of the features described herein, controlling the switching assembly includes putting the charging system into a first charging state in which the positive charge port switch is open, the negative charge port switch is closed, the first switch is closed, the second switch is open, and the third switch is open, and controlling the charging system in at least one of a boost charging mode by operating the conversion circuit as a boost converter, and a buck discharging mode by operating the conversion circuit as a buck converter.

In addition to one or more of the features described herein, controlling the switching assembly includes putting the charging system into a second charging state in which the positive charge port switch is open, the negative charge port switch is closed, the first switch is open, the second switch is closed, and the third switch is closed, and controlling the charging system in at least one of a buck charging mode by operating the conversion circuit as a buck converter, and a boost discharging mode by operating the conversion circuit as a boost converter.

In addition to one or more of the features described herein, the vehicle includes at least one accessory connected to the propulsion bus in parallel with the inverter and the battery system, and controlling the switching assembly includes connecting the at least one accessory by a fourth switch to the battery system and supply power to the at least one accessory during at least one of the charging and the discharging.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
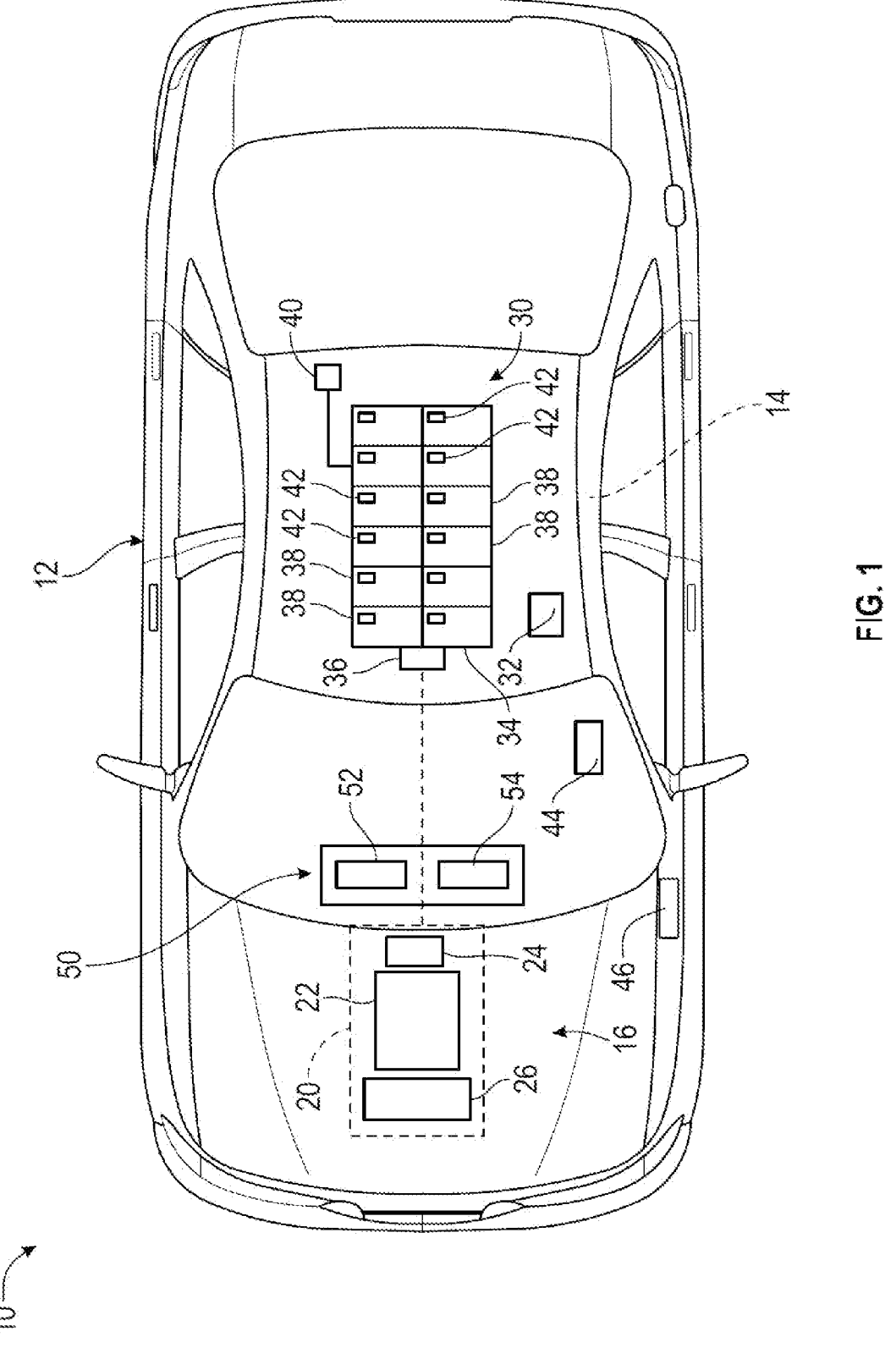
FIG. 1 is a top view of a motor vehicle including a battery assembly or system, a propulsion system and a charging system, in accordance with an exemplary embodiment.

The following description is merely exemplary in nature and is not intended to limit the present disclosure, its application or uses. It should be understood that throughout the drawings, corresponding reference numerals indicate like or corresponding parts and features.

In accordance with exemplary embodiments, methods, devices and systems are provided for supplying electrical power to a battery system of a vehicle (e.g., an electric or hybrid vehicle) from an energy storage system, such as a charging station. The methods, devices and systems are also provided for discharging the vehicle battery system to charge an external energy system (e.g., a battery pack of another electric or hybrid vehicle).

An embodiment of a charging system includes or is connected to a battery system and a propulsion system of a vehicle. The charging system is configured to operate an inverter of the propulsion system as a multi-functional inverter that can be used to control an input voltage (charging voltage) to adjust the input voltage (e.g., step up or step down) to the nominal voltage of the battery system (battery voltage), and/or control an output voltage (discharging voltage) when charging an external system to adjust the output voltage to a voltage of the external system. The charging system is capable of charging using a wide variety of charging schemes, including legacy charging and DC fast charging (DCFC).

In an embodiment, the charging system uses components of an inverter and a motor of a drive system to change an input voltage level according to the requirements or desired parameters of the battery system (when charging) or the external system (when discharging). The charging system includes a switching assembly for putting the charging system into different charging modes, and a controller for controlling the switching assembly and the inverter to regulate or adjust voltage.

Embodiments described herein present numerous advantages and technical effects. The embodiments provide for effective charging and discharging capability when there is a mismatch between a vehicle battery system and a source or external system. The embodiments provide such capabilities using existing vehicle components (e.g., inverter, motor and/or controller), thereby eliminating the need for any additional components such as a dedicated DC-DC converter.

Vehicle battery systems may have different battery voltages, and charging stations and other sources are available that provide charging at different voltage levels. For example, many EVs and hybrids battery systems rated at 400 V, and others have systems rated at 600 V or higher. In addition, charging options range from legacy charging (400 V) to DC fast charging (DCFC) at 800 V, and other charging systems may be rated at other voltages. Thus, when charging or discharging, there can be a mismatch (e.g., a 400 V or 600 V battery system and 800 V DCFC station). Embodiments address such mismatches in an efficient and cost-effective manner so that charging and discharging can be performed in such mismatch situations.

The embodiments are not limited to use with any specific vehicle and may be applicable to various contexts. For example, embodiments may be used with automobiles, trucks, aircraft, construction equipment, farm equipment, automated factory equipment and/or any other device or system that includes multiple drives and/or multiple conversion devices.

FIG. 1 shows an embodiment of a motor vehicle 10, which includes a vehicle body 12 defining, at least in part, an occupant compartment 14. The vehicle body 12 also supports various vehicle subsystems including a propulsion system 16, and other subsystems to support functions of the propulsion system 16 and other vehicle components, such as a braking subsystem, a suspension system, a steering subsystem, and if the vehicle is a hybrid electric vehicle, a fuel injection subsystem, an exhaust subsystem and others.

The vehicle 10 may be an electrically powered vehicle (EV), a hybrid vehicle or any other vehicle that features one or more electric motors or drive systems. The propulsion system 16 may include a drive system 20 that includes an electric motor 22 and an inverter 24, as well as other components such as a cooling system 26. The inverter 24 (e.g., traction power inverter module or TPIM) converts direct current (DC) power from a high voltage (HV) battery pack 34 to poly-phase (e.g., two-phase, three-phase, six-phase, etc.) alternating current (AC) power to drive the motor 22.

FIG. 1 shows the vehicle 10 as having a single drive system: however, embodiments described herein are not so limited. For example, the vehicle 10 may have multiple drive systems (e.g., for driving front wheels and rear wheels). There may be any number of drive systems and/or motors at various locations (e.g., a motor driving each wheel, twin motors per axle, etc.).

The drive system 20 is electrically connected to a battery system 30, and may also be electrically connected to other components, such as vehicle electronics (e.g., via an auxiliary power module or APM 32). The battery system 30 may be configured as a rechargeable energy storage system (RESS).

In an embodiment, the battery system 30 includes a battery assembly such as the battery pack 34. The battery pack 34 may be connected to terminals of a charge port 46 (e.g., DCFC terminals) for direct charging or via, for example, a conversion device such as a DC-DC converter 36.

The battery pack 34 includes a plurality of battery modules 38, where each battery module 38 includes a number of individual cells (not shown). The battery system 30 may also include a monitoring unit 40 configured to receive measurements from sensors 42. Each sensor 42 may be an assembly or system having one or more sensors for measuring various battery and environmental parameters, such as temperature, current and voltages.

The vehicle 10 includes a charging system that can be used to charge the battery pack 34 and/or used to supply power from the battery pack 34 to charge another energy storage system (e.g., vehicle-to-vehicle (V2V) or vehicle-to-everything (V2X) charging). The charging system includes a controller 44 such as an onboard charging module (OBCM) that is electrically connected to the charge port 46 for charging from an energy storage system such as a utility AC power supply. The charge port 46 may be configured to accept DC power for fast charging of the battery pack 34 directly when connected via DC contactors (for example, switches 72 and 74 of FIG. 3).

Any of various controllers can be used to control functions of the charging system and/or other vehicle systems. A controller includes any suitable processing device or unit and may use an existing controller such as the OBCM, and/or controllers in the drive system.

The vehicle 10 also includes a computer system 50 that includes one or more processing devices 52 and a user interface 54. The computer system 50 may communicate with the charging system controller, for example, to provide commands thereto in response to a user input. The various processing devices, modules and units may communicate with one another via a communication device or system, such as a controller area network (CAN), local interconnect network (LIN) or transmission control protocol (TCP) bus.

Figure 2:
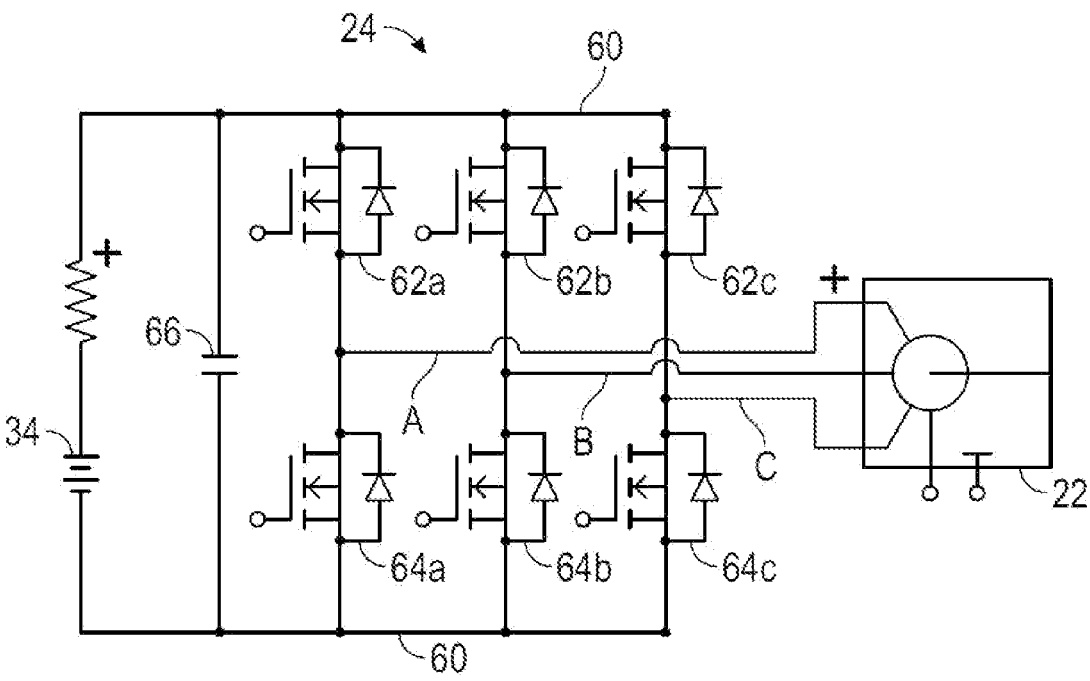
FIG. 2 depicts an example of an inverter used in the propulsion system of FIG. 1.

FIG. 2 schematically depicts an example of the inverter 24. The inverter 24 includes a number of switching devices (referred to as inverter switches), which are connected to the battery pack 34 by a propulsion bus 60. The motor 22, in an embodiment, is a three-phase AC motor receiving three-phase AC power (although embodiments described herein can be used with motors or machines having any number of phases).

The inverter switches are operable to convert DC power from the battery pack 34 to three-phase AC power, and supply the AC power to drive the motor 22. In addition, as discussed further herein, some or all of the inverter switches are operable by the controller 44 to operate the inverter 24 as a boost converter and/or a buck converter.

For example, a first switching system in the inverter 24 includes an upper inverter switch 62a and a lower inverter switch 64a connected to a first phase (phase A) of the motor 22, a second switching system includes an upper inverter switch 62b and a lower inverter switch 64b connected to a second phase (phase B), and a third switching system includes an upper inverter switch 62c and a lower inverter switch 64c connected to a third phase (phase C). Additional components may be included, such as a capacitor 66 for ripple current and voltage stabilization.

Sets of inverter switches form half-bridges connected to phases of the motor 22. For example, the switches 62a and 64a form a half-bridge that is connected to a phase A winding of the motor 22, and the switches 62b and 64b form a half-bridge connected to a phase B winding. The switches 62c and 64c form a half-bridge connected to a phase C winding.

In an embodiment, each inverter switch is a semiconductor switch. As non-limiting examples, inverter switches (and any other switches described herein) may include metal-oxide-semiconductor (MOS)-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable low loss device of suitable voltage and current ratings.

FIGS. 3-6 depict an embodiment of the charging system (denoted herein as charging system 70). The charging system 70 is capable of providing a wide variety of charging modalities, including conventional or legacy charging, DC fast charging (DCFC), vehicle-to-vehicle (V2V), vehicle-to-trailer charging, vehicle-to-everything (V2X) charging and others.

The charging system 70 is shown as being controlled by the controller 44. However, the charging system 70 or components thereof may be controlled by any suitable controller or processing device, such as a controller in the propulsion system or a controller of a battery management system (BMS).

As shown, the inverter 24 is connected to the propulsion bus 60 in parallel with the battery pack 34, and is connected to the motor 22 via phase A, B and C terminals (or any conductors). Other components (referred to herein as accessories) may be connected to the propulsion bus 60 in order to be powered by the battery pack 34. For example, the APM 32 and one or more components of the cooling system 26 (e.g., an air conditioning electric compressor (ACEC)), are connected to the propulsion bus 60 in parallel with the battery pack 34 and the inverter 24.

The charging system 70 includes a switching assembly that has various switches controlled by the controller 44 for connecting and disconnecting the inverter 24 and other components from the charge port 46. The switching assembly is also controlled to define a conversion circuit that includes the motor 22 and at least one set of inverter switches. The controller 44 also controls the inverter switches to adjust input (charging) voltages and/or output (discharging) voltages to accommodate mismatches between the voltage of the battery pack 34 (battery voltage) and the voltage of a charging station or power supply.

Generally, the charging system 70 is able to charge the battery pack 34 from a source having a different voltage, or discharge the battery pack 34 (e.g. for V2V charging) to an external energy storage device having a different voltage, by controlling switches in the switching assembly and operating the inverter 24 as a boost converter or buck converter to step up or step down voltage as needed. In this way, the charging system 70 is able to charge and discharge without needing any additional components, such as a dedicated DC-DC converter (e.g., an additional converter separate from the DC-DC converter 36). For example, the charging system 70 uses existing inverters to step up or step down to achieve normal charging voltages (e.g., 400 V), and to achieve other voltages such as DCFC voltages (e.g., 800 V) and voltages of external energy storage systems.

The switching assembly includes switches to selectively connect the battery pack 34 (B1) to the charge port 46 to provide DCFC or another charging scheme. For example, the charge port 46 is selectively connected to the propulsion bus 60 and the battery pack 34 (B1) by switches 72 (SC1) and 74 (SC2) (also referred to as charge port switches).

The switching assembly includes additional switches to allow the charging system 70 to operate components of the inverter 24 as a buck and/or boost converter (conversion circuit). In an embodiment, the switching assembly includes a switch 76 (S1) for selectively connecting the inverter and accessories to a positive terminal of the battery pack 34, and a switch 78 (S2) for selectively connecting the inverter 24 to a negative terminal of the battery pack 34. In some embodiments, the switch 78 (S2) can be excluded and replaced by, for example, a pre-charge relay and resistor across the switch 76 (S1) for pre-charging the propulsion bus 60.

The switching assembly includes a first switch (denoted as switch 80 (SC3)) that selectively connects the charge port 46 to a neutral point of the motor 22. Alternatively, the switch 80 (SC3) can be connected to one of the phase terminals (e.g., via a connection 81). For example, the switch 80 (SC3) is used to selectively connect a positive terminal of the charge port 46 to the motor 22.

In an embodiment, the switch 80 (SC3) is connected to a selected phase terminal or neutral point of a stator winding of the motor 22. In this embodiment, additional switches can be added in connection with phase terminals to prescribe which phase is used to define a conversion circuit (e.g., based on the motor's rotor position).

The switch 80 (SC3) is closed to provide a connection from the positive terminal of the charge port 46 to the motor 22 for boost mode charging (i.e., charging from a source having a voltage that is lower than the battery voltage) or buck mode discharging (i.e., charging an external energy storage system such as another vehicle battery having a voltage that is lower than the battery voltage).

A second switch (denoted switch 82 (SC4)) selectively connects the charge port 46 to the inverter 24, for example, by selectively connecting the positive terminal of the charge port 46 to the inverter 24. A third switch (denoted switch 84 (S3)) selectively connects the battery pack 34 to a neutral point or phase terminal of the motor 22. The switch 82 (SC4) is operable to provide for buck mode charging (i.e., charging from a source having a voltage that is higher than the battery voltage) or boost mode discharging (i.e., charging an energy storage system such as another vehicle battery having a voltage that is higher than the battery voltage).

The motor 22 and the inverter 24 form a three-phase or two-phase interleaved boost converter or buck converter during charging or discharging when appropriate switches are set.

Figure 3:
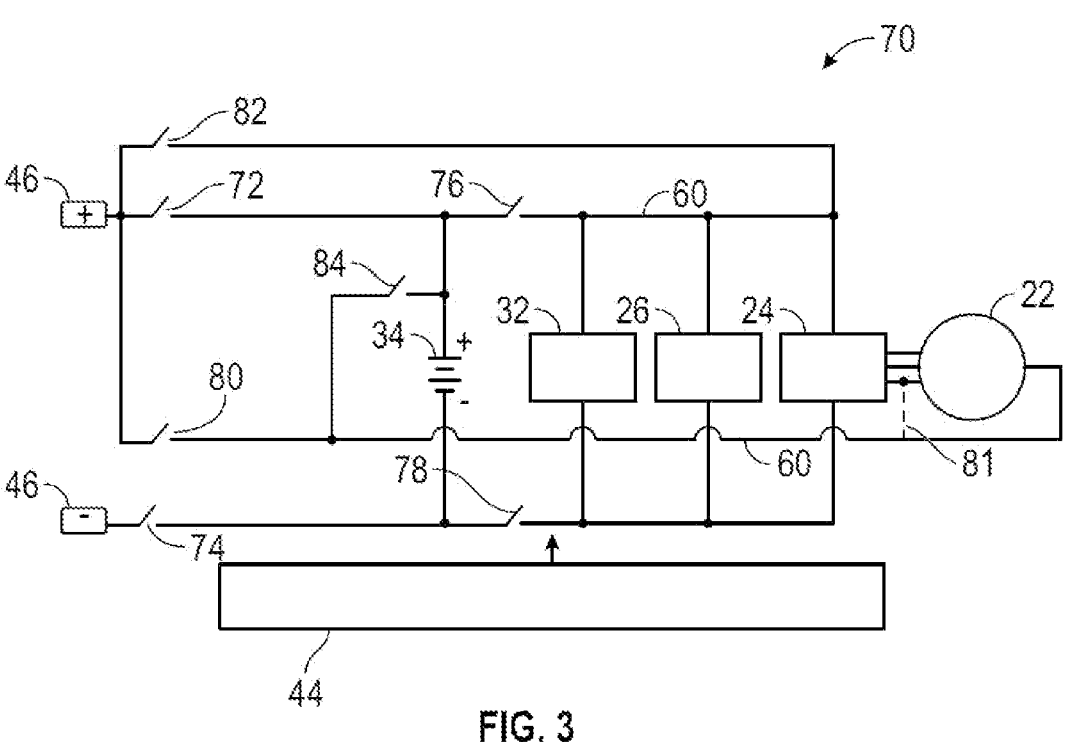
FIG. 3 depicts a charging system that includes a switching assembly and components of a drive system for charging a vehicle battery system and/or providing charge to an external energy storage system, in accordance with an exemplary embodiment.

FIG. 3 shows the charging system 70 in an OFF mode, in which all of the switches are open (turned OFF). The controller 44 controls the various switches in order to change between various modes, which include the OFF mode, a propulsion mode and one or more charging modes. In the propulsion mode, the battery pack 34 supplies power to the inverter 24 to drive the motor 22. In the propulsion mode, the switches 76 (S1) and 78 (S2) are closed (turned ON) to connect the battery pack 34 to the inverter 24, and the remaining switches 72 (SC1), 74 (SC2), 80 (SC3), 82 (SC4) and 84 (S3) are open.

Figure 4:
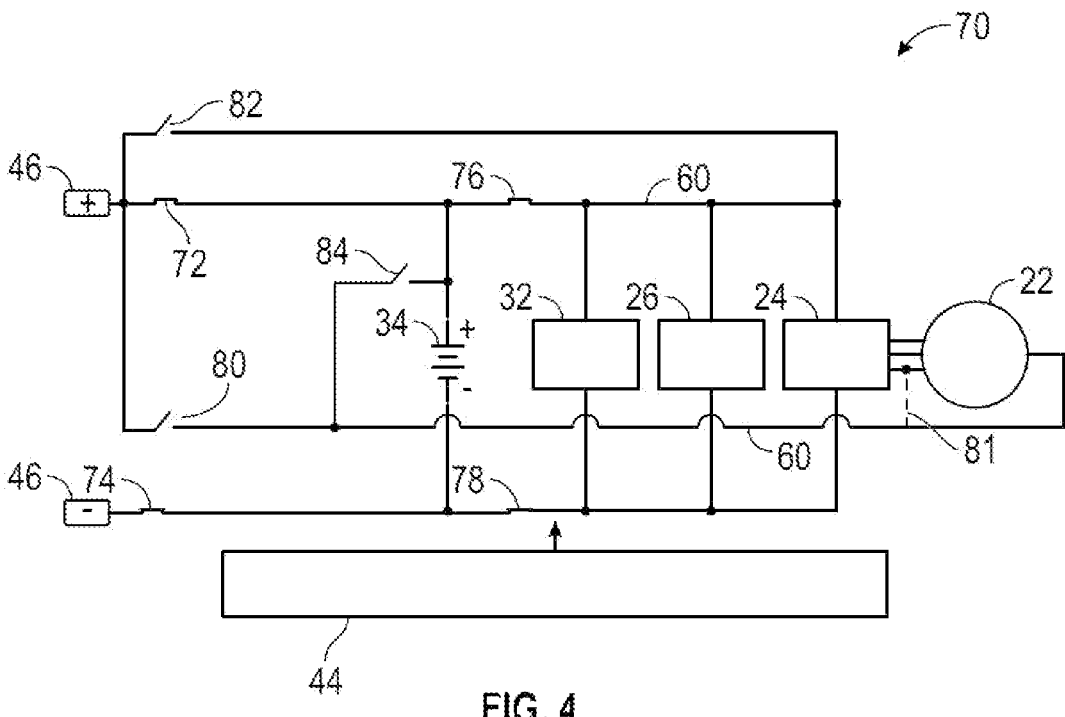
FIG. 4 depicts the charging system of FIG. 3 and switch positions in a switching state that corresponds to a normal charging mode.

FIG. 4 depicts the charging system 70 and shows the switching positions or switching states of the switches when the charging system 70 is in a "normal" charging mode. This mode may be used when the battery pack 34 is to be charged from a source that has the same voltage as the battery voltage, or when the vehicle 10 is used to charge another energy storage system (e.g., another vehicle). In the normal charging mode, the switches 72 (SC1) and 74 (SC2) are closed, and the switches 76 (S1) and 78 (S2) are closed. The remaining switches 80 (SC3), 82 (SC4) and 84 (S3) are open.

Figure 5:
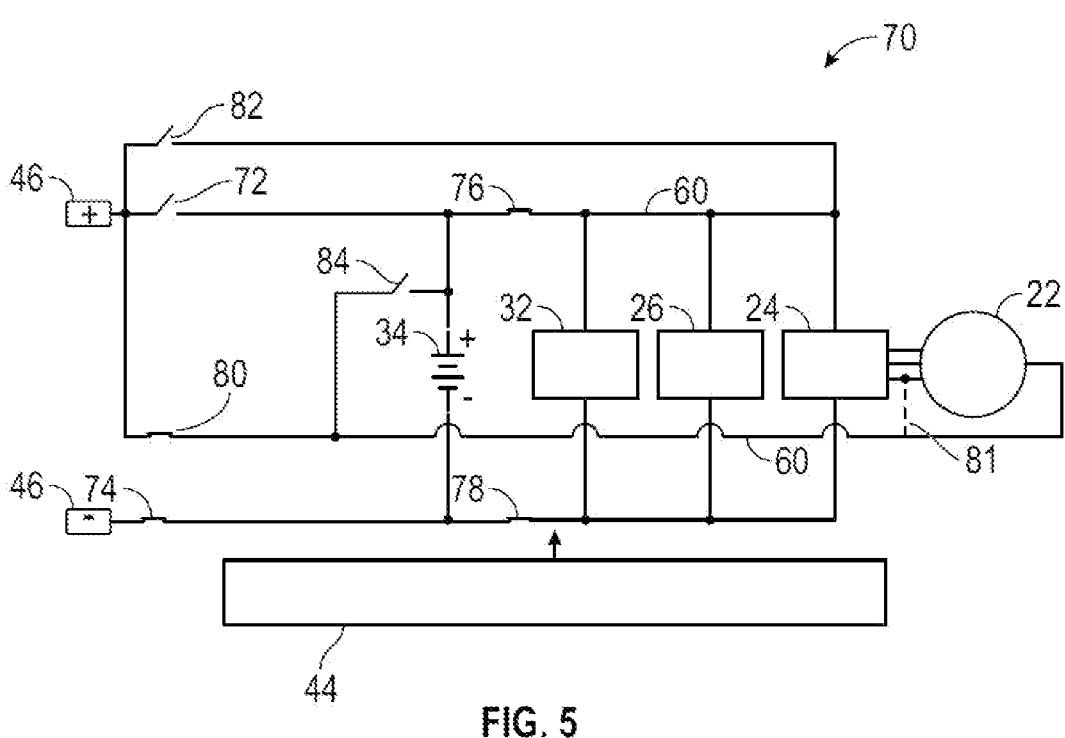
FIG. 5 depicts the charging system of FIG. 3 and switch positions in a switching state that corresponds to a boost charging and a buck discharging mode.

FIG. 5 depicts the charging system 70 when the charging assembly is in a first charging state, in which the inverter 24 can be put into a "boost charging" mode or a "buck discharging" mode. These modes are useful when the charge port 46 is connected to a source or energy storage system that has a voltage lower than the battery voltage. For example, the vehicle may have a battery voltage of 600 V and the charge port 46 is connected to a legacy charging station of 400 V, or the charge port 46 is connected to another vehicle that has a 400 V battery system. In an embodiment, if accessories such as the APM 32 and the cooling system 26 are connected to the propulsion bus 60, the accessories may be rated to operate at a voltage that is at least equal to the highest voltage component (the source, energy storage system or vehicle battery).

Referring to FIG. 2, in the boost charging mode, the inverter switches are operated so that the inverter 24 acts as a boost converter to "boost" or step up the voltage from the source to the battery voltage. To operate the inverter 24 as a boost converter, a set (i.e., one or more) of lower inverter switches (e.g., the lower switches 64*a*, 64*b* and 64*c*) are activated and operated according to a selected PWM duty cycle. If modulation with a primary and secondary channel is used, the lower switches are cycled to generate primary pulses, and the upper switches are cycled to generate secondary pulses.

In the buck discharging mode, the inverter switches are operated so that the inverter acts as a buck converter to "buck" or step down the voltage from the battery voltage to the energy storage system voltage. To operate the inverter 24 as a buck converter, a set of upper switches (e.g., the higher switches 62*a*, 62*b* and 62*c*) are activated and operated using a selected PWM duty cycle. If modulation with a primary and secondary channel is used, the upper switches are cycled to generate primary pulses, and the lower switches are cycled to generate secondary pulses. Whether operating as a boost or buck converter, the PWM frequency and duty cycle of the inverter may be controlled to minimize the overall losses in the drive unit while providing the desired voltage.

Referring again to FIG. 5, to put the charging system 70 into the boost charging or buck discharging mode, the switches 76 (S1) and 78 (S2) are closed, and the switch 84 (S3) is open. The switches 74 (SC2) and 80 (SC3) are closed, and the switches 72 (SC1) and 82 (SC4) are open.

Figure 6:
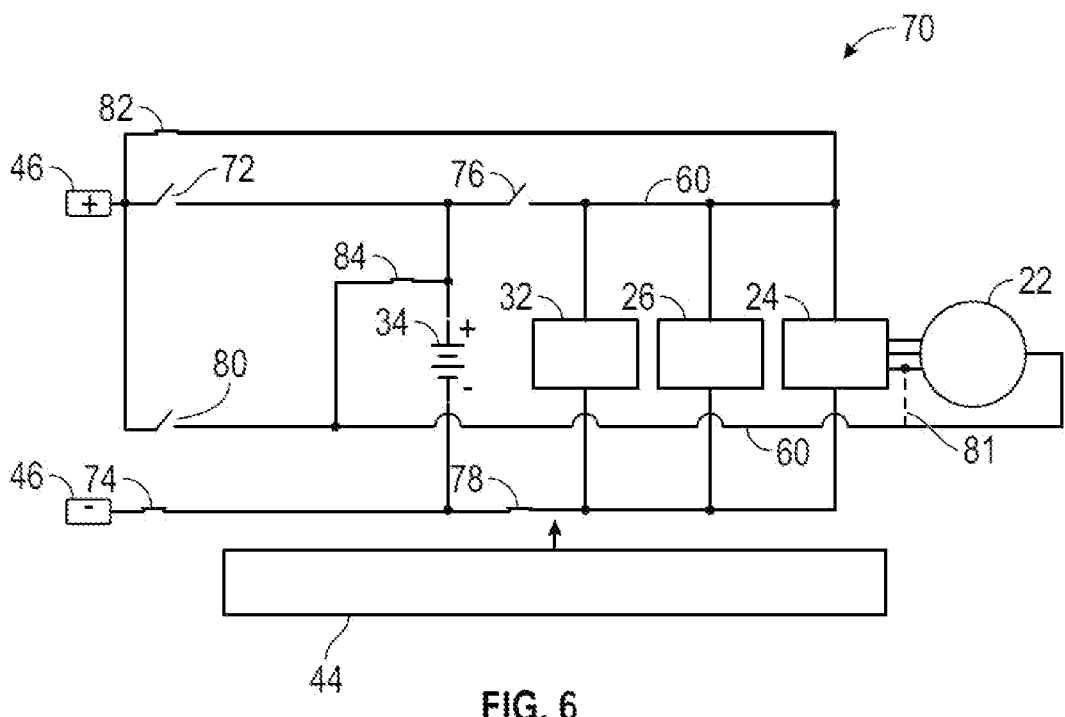
FIG. 6 depicts the charging system of FIG. 3 and switch positions in a switching state that corresponds to a buck charging and a boost discharging mode.

FIG. 6 depicts the charging system 70 when the charging assembly is in a "buck charging" mode or a "boost discharging" mode. These modes are useful when the charge port is connected to a source or energy storage system that has a voltage that is higher than the battery voltage. For example, the vehicle 10 may have a battery voltage of 400 V or 600 V, and the charge port 46 is connected to a DCFC charging station of 800 V, or the charge port 46 is connected to another vehicle that has a higher voltage battery system. In an embodiment, if accessories are connected to the propulsion bus 60, the accessories may be rated to operate at a voltage that is at least equal to the highest voltage component (the source, energy storage system or vehicle battery).

In the buck charging mode, the inverter switches are operated so that the inverter 24 acts as a buck converter. In the boost discharging mode, the inverter switches are operated so that the inverter 24 acts as a boost converter.

To put the charging system 70 into the buck charging or boost discharging mode, the switch 76 (S1) is open, and the switches 78 (S2) and 84 (S3) are closed. The switches 72 (SC1) and 80 (SC3) are open, and the switches 74 (SC2) and 82 (SC4) are closed.

The following table illustrates various operating modes of the embodiment of FIGS. 3-6, and the switching position of each switch in each operating mode:

| MODE | S1 | S2 | S3 | SC1 | SC2 | SC3 | SC4 | Inverter Switches |
|---|---|---|---|---|---|---|---|---|
| Key OFF | OFF | OFF | OFF | OFF | OFF | OFF | OFF | None |
| Propulsion | ON | ON | OFF | OFF | OFF | OFF | OFF | Hi & LO |
| Normal Charging | ON | ON | OFF | ON | ON | OFF | OFF | None |
| Boost Charging | ON | ON | OFF | OFF | ON | ON | OFF | LO Side |
| Buck Charging | OFF | ON | ON | OFF | ON | OFF | ON | HI Side |

-continued

| MODE | S1 | S2 | S3 | SC1 | SC2 | SC3 | SC4 | Inverter Switches |
|------|----|----|----|-----|-----|-----|-----|-------------------|
| Boost Dis-charging | OFF | ON | ON | OFF | ON | OFF | ON | LO Side |
| Buck Dis-charging | ON | ON | OFF | OFF | ON | ON | OFF | HI Side |

In the above table, "HI & LO" indicates that the upper inverter switches and lower inverter switches are activated and used for driving the motor 22. "LO Side" indicates that the lower switches 64a, 64b and 64c of the inverter 24 are active and being operated (or both upper and lower switches are active, where the lower switches are used for primary PWM pulsing while the upper switches are pulsed by the complimentary signal of the primary PWM pulse, with a dead time to prevent any shoot-through). "HI Side" indicates that the upper switches 62a, 62b and 62c of the inverter 24 are active and being operated (or both upper and lower switches are active, where the upper switches are used for primary PWM pulsing, while the lower switches are pulsed by the complimentary signal of the primary PWM pulse, with a dead time to prevent any shoot-through).

Figure 7:
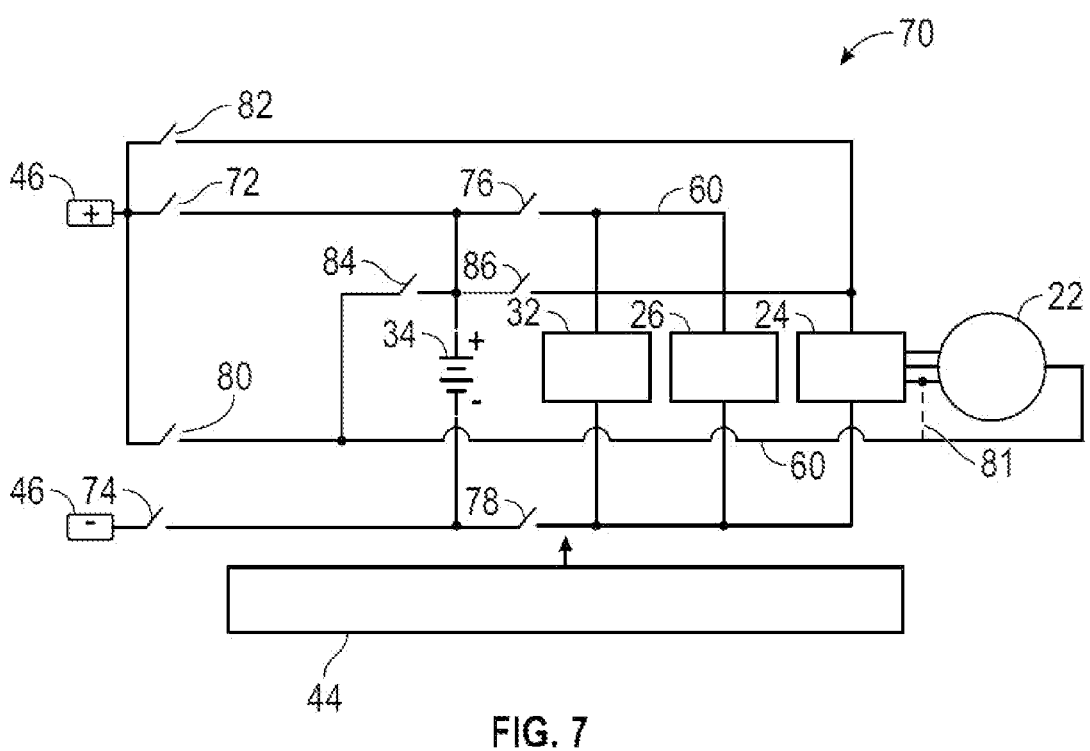
FIG. 7 depicts a charging system that includes a switching assembly and components of a drive system for charging a vehicle battery system and/or providing charge to an external energy storage system, in accordance with an exemplary embodiment.
Figure 8:
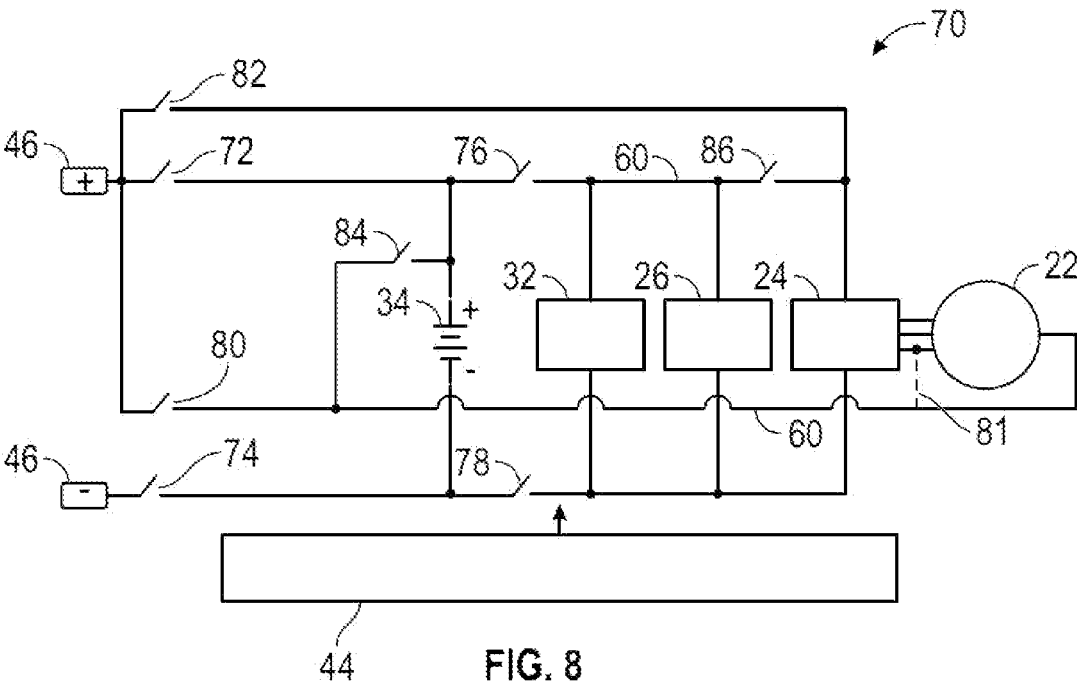
FIG. 8 depicts a charging system that includes a switching assembly and components of a drive system for charging a vehicle battery system and/or providing charge to an external energy storage system, in accordance with an exemplary embodiment.

In embodiments shown in FIGS. 7 and 8, the charging system 70 includes a fourth switch 86 (S4). The switch 86 (S4) is controllable to allow accessories such as the APM 32 and the cooling system 26 to be powered by the battery pack 34 during charging or discharging. This allows the accessories to continue to receive power and operate normally during charging and discharging. This embodiment may be useful in situations where the vehicle 10 is being charged from a source having a voltage that exceeds an accessory's voltage rating (i.e., during the buck charging mode).

FIGS. 7 and 8 depict alternative configurations of the switch 86 (S4). The additional switch 86 (S4) can be operated to connect the accessories during charging. In addition, the switch 86 (S4) allows the accessories to be disconnected, for example, when charging from a higher voltage source (buck charging) if the accessories are not rated for such a voltage.

The following table illustrates various operating modes, and associated switching states or positions of the switches, of the embodiments of FIGS. 7 and 8:

| MODE | S1 | S2 | S3 | S4 | SC1 | SC2 | SC3 | SC4 | Inverter Switches |
|------|----|----|----|----|-----|-----|-----|-----|-------------------|
| Key OFF | OFF | OFF | OFF | OFF | OFF | OFF | OFF | OFF | None |
| Propulsion | ON | ON | OFF | ON | OFF | OFF | OFF | OFF | Hi & LO |
| Normal Charging | ON | ON | OFF | OFF | ON | ON | OFF | OFF | None |
| Boost Charging | ON | ON | OFF | ON | OFF | ON | ON | OFF | LO Side |
| Buck Charging | ON | ON | ON | OFF | OFF | ON | OFF | ON | HI Side |
| Boost Discharging | ON | ON | ON | OFF | OFF | ON | OFF | ON | LO Side |
| Buck Discharging | ON | ON | OFF | ON | OFF | ON | ON | OFF | HI Side |

In the above table, "HI & LO" indicates that the upper inverter switches and lower inverter switches are activated and used for driving the motor 22. "LO Side" indicates that the lower switches 64a, 64b and 64c of the inverter 24 are active and being operated (or both upper and lower switches are active, where the lower switches are used for primary PWM pulsing while the upper switches are pulsed by the complimentary signal of the primary PWM pulse, with a dead time to prevent any shoot-through). "HI Side" indicates that the upper switches 62a, 62b and 62c of the inverter 24 are active and being operated (or both upper and lower switches are active, where the upper switches are used for primary PWM pulsing, while the lower switches are pulsed by the complimentary signal of the primary PWM pulse, with a dead time to prevent any shoot-through).

Additional diagnostic and protection functions may be incorporated into the controller 44 to ensure the most efficient charging at the requested power, voltage and current level using existing sensors and serial communication channels between various controllers.

Figure 9:
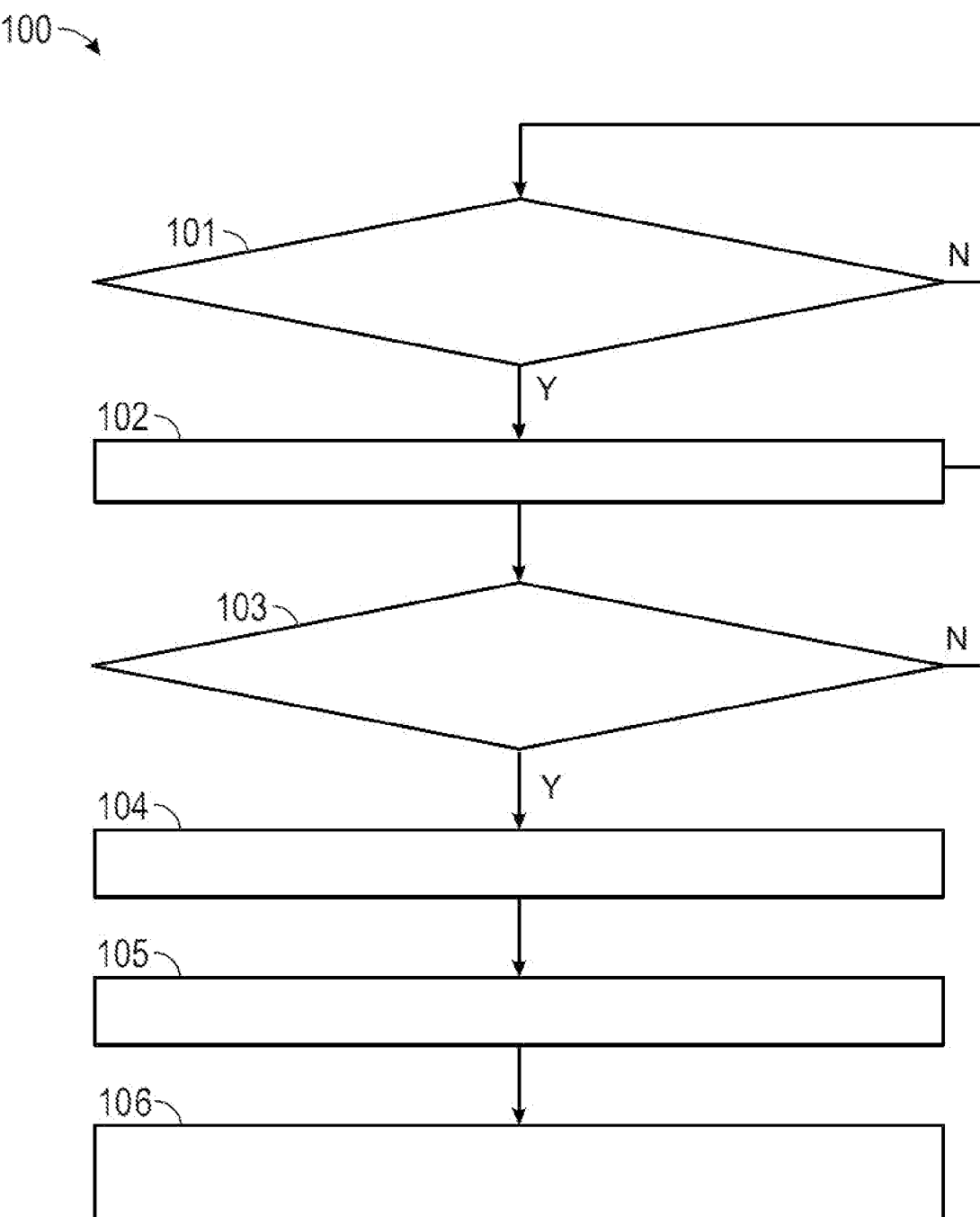
FIG. 9 is a flow diagram depicting aspects of a method of controlling a vehicle charging system, in accordance with an exemplary embodiment.

FIG. 9 illustrates embodiments of a method 100 of controlling a propulsion system, and controlling the transfer of charge between a vehicle battery system and an energy storage system. Aspects of the method 100 may be performed by a processor or processors disposed in a vehicle, such as the controller 44. The method 100 is described in conjunction with an example in which the controller 44 is a separate controller, however the method 100 is not so limited, as the method may be performed by any suitable processing device or system, or combination of processing devices.

The method 100 includes a number of steps or stages represented by blocks 101-106. The method 100 is not limited to the number or order of steps therein, as some steps represented by blocks 101-106 may be performed in a different order than that described below, or fewer than all of the steps may be performed.

At block 101, the controller 44 monitors the battery system 40 and/or other vehicle system(s), and determines whether it is desired to charge the battery pack 34 from a power source (e.g., a DCFC charging station), or discharge in order to charge an external energy storage system (e.g., another vehicle's battery system). The determination may be based on receiving a request (e.g., via user interaction with the vehicle 10 or a request from a second vehicle or other remote entity), or by monitoring the battery system 30. If the controller does not determine that it is desired to charge or discharge, the controller 44 continues to monitor the battery system 40 and/or other vehicle system(s).

At block 102, if charging or discharging is desired, a power source or the external energy storage system is connected (e.g., via a charge cable) to the charge port 46. The voltage of the power source or the external energy storage system is read. The controller 44 may determine various charge parameters such as the source or energy storage system voltage, maximum allowable charge current and desired charge energy. The controller 44 compares the battery voltage (and optionally voltage ratings of one or more accessories).

At block 103, the controller 44 determines whether a voltage increase or decrease is desired based on the comparison. If not, the controller 44 continues to compare the battery voltage and/or voltage ratings of the one or more accessories.

At block 104, if charging is desired, the controller 44 puts the charging system 70 into a boost charging mode or buck charging mode, depending on whether the power source has a higher or lower voltage than the battery voltage. If discharging is desired, the controller 44 puts the charging system 70 into a boost discharging mode or buck discharging mode, depending on whether the external energy storage system has a higher or lower voltage than the battery voltage. The charging system is put into the desired mode by controlling the various switches as described herein.

At block 105, the controller 44 controls the charging system 70 and switches to operate the inverter 24 and the motor 22 as a boost conversion circuit or a buck conversion circuit. The controller applies an interleaved PWM of selected switches based on the charging mode. If the charging system 70 is connected to multiple motor phases, the set of inverter switches is selected as a function of stopped rotor position.

At block 106, the source or external energy storage system is disconnected from the charge port 46. The controller 44 transitions the vehicle 10 back to the propulsion mode (or an OFF mode) by controlling switches as discussed herein.

Figure 10:
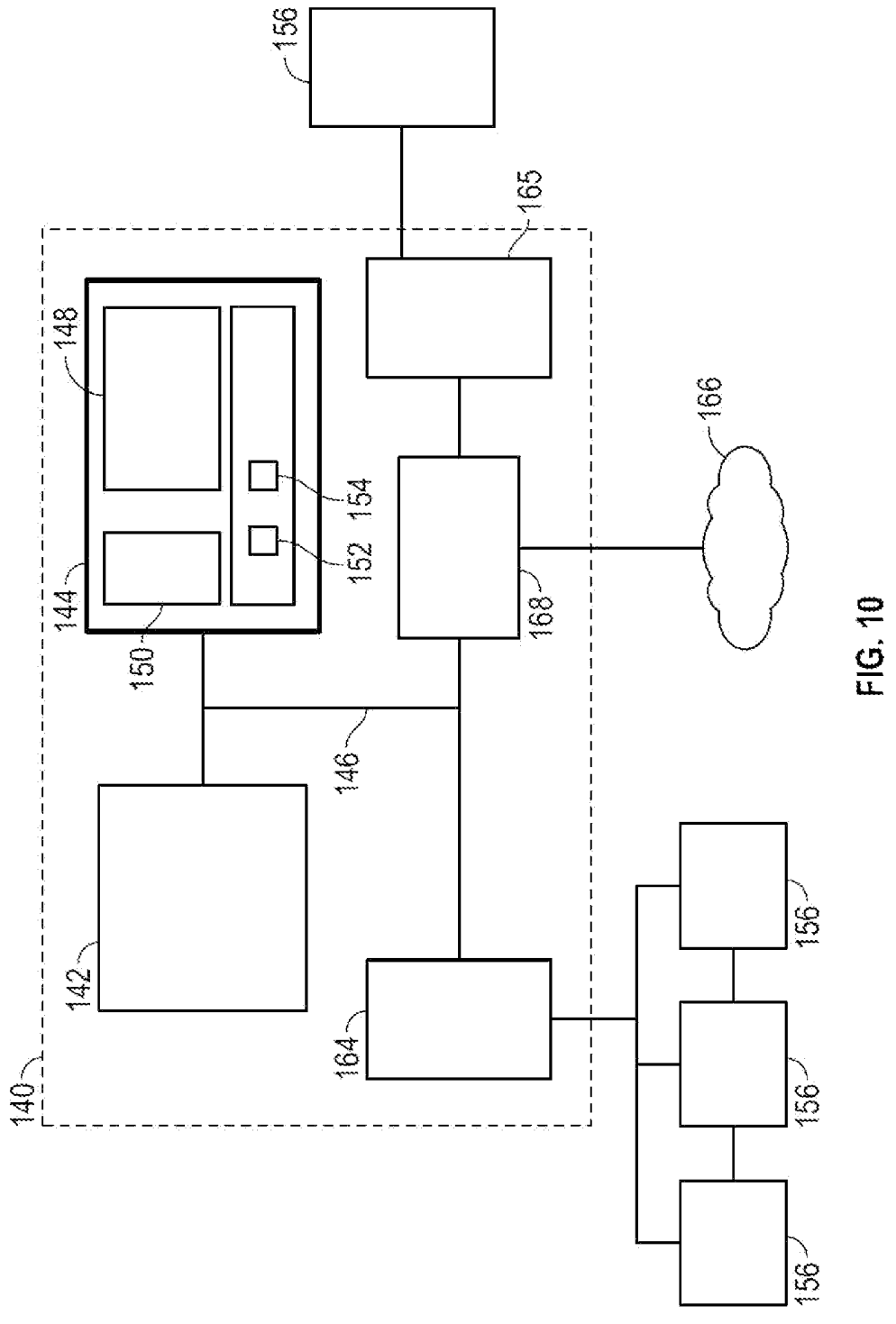
FIG. 10 depicts a computer system in accordance with an exemplary embodiment.

FIG. 10 illustrates aspects of an embodiment of a computer system 140 that can perform various aspects of embodiments described herein. The computer system 140 includes at least one processing device 142, which generally includes one or more processors for performing aspects of image acquisition and analysis methods described herein.

Components of the computer system 140 include the processing device 142 (such as one or more processors or processing units), a memory 144, and a bus 146 that couples various system components including the system memory 144 to the processing device 142. The system memory 144 can be a non-transitory computer-readable medium, and may include a variety of computer system readable media. Such media can be any available media that is accessible by the processing device 142, and includes both volatile and non-volatile media, and removable and non-removable media.

For example, the system memory 144 includes a non-volatile memory 148 such as a hard drive, and may also include a volatile memory 150, such as random access memory (RAM) and/or cache memory. The computer system 140 can further include other removable/non-removable, volatile/non-volatile computer system storage media.

The system memory 144 can include at least one program product having a set (e.g., at least one) of program modules that are configured to carry out functions of the embodiments described herein. For example, the system memory 144 stores various program modules that generally carry out the functions and/or methodologies of embodiments described herein. A module 152 may be included for performing functions related to monitoring a propulsion system, and a module 154 may be included to perform functions related to switching between charging modes and controlling aspects of the propulsion system as described herein.

The system 140 is not so limited, as other modules may be included. As used herein, the term "module" refers to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

The processing device 142 can also communicate with one or more external devices 156 as a keyboard, a pointing device, and/or any devices (e.g., network card, modem, etc.) that enable the processing device 142 to communicate with one or more other computing devices. Communication with various devices can occur via Input/Output (I/O) interfaces 164 and 165.

The processing device 142 may also communicate with one or more networks 166 such as a local area network (LAN), a general wide area network (WAN), a bus network and/or a public network (e.g., the Internet) via a network adapter 168. It should be understood that although not shown, other hardware and/or software components may be used in conjunction with the computer system 40. Examples include, but are not limited to: microcode, device drivers, redundant processing units, external disk drive arrays, RAID systems, and data archival storage systems, etc.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A charging system of a vehicle, comprising:
   an inverter of a propulsion system of the vehicle, the inverter connected to an electric motor and a battery system of the vehicle;

a switching assembly including a plurality of switches; and a controller configured to control the switching assembly to connect the inverter and the electric motor to a charge port of the vehicle and define a conversion circuit including one or more inverter switches and the electric motor by selectively connecting the charge port to the inverter or the electric motor and selectively connecting the battery system to the electric motor by the switching assembly, wherein:

the controller is configured to operate the conversion circuit to adjust at least one of: an input voltage for charging the battery system from a power source, and an output voltage for discharging the battery system to charge an external energy storage system; and the battery system and the inverter are connected in parallel to a propulsion bus, the switching assembly includes a positive charge port switch configured to selectively connect a positive charge port terminal to the propulsion bus and a negative charge port switch configured to selectively connect a negative charge port terminal to the propulsion bus, a first switch configured to selectively connect the positive charge port terminal to the electric motor, a second switch configured to selectively connect the positive charge port terminal to the inverter, and a third switch configured to selectively connect the battery system to the electric motor, and the controller is configured to control one or more of the first switch, the second switch and the third switch to put the charging system into a selected charging mode.

2. The charging system of claim 1, wherein the controller is configured to adjust the input voltage to conform the input voltage to a battery voltage of the battery system, and adjust the output voltage to conform the output voltage to a voltage of the external energy storage system.

3. The charging system of claim 1, wherein the controller is configured to operate the conversion circuit as a boost circuit by controlling a set of lower inverter switches, and operate the conversion circuit as a buck converter by controlling a set of upper inverter switches.

4. The charging system of claim 1, wherein the first switch is configured to selectively connect the positive charge port to a neutral point of the electric motor or a phase terminal of the electric motor, and the third switch is configured to selectively connect the battery system to the neutral point of the electric motor or the phase terminal of the electric motor.

5. The charging system of claim 1, wherein the controller is configured to put the charging system into a first charging state in which the positive charge port switch is open, the negative charge port switch is closed, the first switch is closed, the second switch is open, and the third switch is open, the controller configured to control the charging system in at least one of:

a boost charging mode by operating the conversion circuit as a boost converter; and a buck discharging mode by operating the conversion circuit as a buck converter.

6. The charging system of claim 1, wherein the controller is configured to put the charging system into a second charging state in which the positive charge port switch is open, the negative charge port switch is closed, the first switch is open, the second switch is closed, and the third switch is closed, the controller configured to control the charging system in at least one of:

a buck charging mode by operating the conversion circuit as a buck converter; and a boost discharging mode by operating the conversion circuit as a boost converter.

7. The charging system of claim 1, wherein the vehicle includes at least one accessory connected to the propulsion bus in parallel with the inverter and the battery system.

8. The charging system of claim 7, wherein the controller is configured to control the switching assembly to connect the at least one accessory by a fourth switch to the battery system and supply power to the at least one accessory during at least one of the charging and the discharging.

9. A method of controlling a charging system of a vehicle, comprising:

receiving a request to charge a battery system of the vehicle from a power source, or a request to discharge the battery system to charge an external energy storage system, the vehicle including a propulsion system having an inverter connected to an electric motor and the battery system of the vehicle;

determining charging parameters including a battery system voltage, and a voltage of the power source or external energy storage system;

controlling a switching assembly including a plurality of switches to connect the inverter and the electric motor to a charge port of the vehicle, and defining a conversion circuit including one or more inverter switches and the electric motor by selectively connecting the charge port to the inverter or the electric motor and selectively connecting the battery system to the electric motor by the switching assembly; and operating the conversion circuit to adjust an input voltage for charging the battery system from the power source, or an output voltage for discharging the battery system to charge the external energy storage system, wherein:

the battery system and the inverter are connected in parallel to a propulsion bus, the switching assembly includes a positive charge port switch configured to selectively connect a positive charge port terminal to the propulsion bus and a negative charge port switch configured to selectively connect a negative charge port terminal to the propulsion bus, a first switch configured to selectively connect the positive charge port terminal to the electric motor, a second switch configured to selectively connect the positive charge port terminal to the inverter, and a third switch configured to selectively connect the battery system to the electric motor, and controlling the switching assembly includes controlling one or more of the first switch, the second switch and the third switch to put the charging system into a selected charging mode.

10. The method of claim 9, wherein the conversion circuit is operated as a boost circuit by controlling a set of lower inverter switches, and is operated as a buck converter by controlling a set of upper inverter switches.

11. The method of claim 9, wherein the first switch is configured to selectively connect the positive charge port to a neutral point of the electric motor or a phase terminal of the electric motor, and the third switch is configured to selectively connect the battery system to the neutral point of the electric motor or the phase terminal of the electric motor.

12. The method of claim 9, wherein controlling the switching assembly includes putting the charging system into a first charging state in which the positive charge port switch is open, the negative charge port switch is closed, the first switch is closed, the second switch is open, and the third switch is open, and controlling the charging system in at least one of:

a boost charging mode by operating the conversion circuit as a boost converter; and a buck discharging mode by operating the conversion circuit as a buck converter.

13. The method of claim 9, wherein controlling the switching assembly includes putting the charging system into a second charging state in which the positive charge port switch is open, the negative charge port switch is closed, the first switch is open, the second switch is closed, and the third switch is closed, and controlling the charging system in at least one of:

a buck charging mode by operating the conversion circuit as a buck converter; and a boost discharging mode by operating the conversion circuit as a boost converter.

14. The method of claim 9, wherein the vehicle includes at least one accessory connected to the propulsion bus in parallel with the inverter and the battery system, and controlling the switching assembly includes connecting the at least one accessory by a fourth switch to the battery system and supplying power to the at least one accessory during at least one of the charging and the discharging.

15. A vehicle system comprising:

a memory having computer readable instructions; and a processing device for executing the computer readable instructions, the computer readable instructions controlling the processing device to perform a method including:

receiving a request to charge a battery system of the vehicle from a power source, or a request to discharge the battery system to charge an external energy storage system, the vehicle including a propulsion system having an inverter connected to an electric motor and the battery system of the vehicle;

determining charging parameters including a battery system voltage, and a voltage of the power source or external energy storage system;

controlling a switching assembly including a plurality of switches to connect the inverter and the electric motor to a charge port of the vehicle, and defining a conversion circuit including one or more inverter switches and the electric motor by selectively connecting the charge port to the inverter or the electric motor and selectively connecting the battery system to the electric motor by the switching assembly; and operating the conversion circuit to adjust an input voltage for charging the battery system from the power source, or an output voltage for discharging the battery system to charge the external energy storage system, wherein:

the battery system and the inverter are connected in parallel to a propulsion bus, the switching assembly includes a positive charge port switch configured to selectively connect a positive charge port terminal to the propulsion bus and a negative charge port switch configured to selectively connect a negative charge port terminal to the propulsion bus, a first switch configured to selectively connect the positive charge port terminal to the electric motor, a second switch configured to selectively connect the positive charge port terminal to the inverter, and a third switch configured to selectively connect the battery system to the electric motor, and controlling the switching assembly includes controlling one or more of the first switch, the second switch and the third switch to put the charging system into a selected charging mode.

16. The vehicle system of claim 15, wherein the conversion circuit is operated as a boost circuit by controlling a set of lower inverter switches, and is operated as a buck converter by controlling a set of upper inverter switches.

17. The vehicle system of claim 15, wherein the first switch is configured to selectively connect the positive charge port to a neutral point of the electric motor or a phase terminal of the electric motor, and the third switch is configured to selectively connect the battery system to the neutral point of the electric motor or the phase terminal of the electric motor.

18. The vehicle system of claim 15, wherein controlling the switching assembly includes putting the charging system into a first charging state in which the positive charge port switch is open, the negative charge port switch is closed, the first switch is closed, the second switch is open, and the third switch is open, and controlling the charging system in at least one of:

a boost charging mode by operating the conversion circuit as a boost converter; and a buck discharging mode by operating the conversion circuit as a buck converter.

19. The vehicle system of claim 15, wherein controlling the switching assembly includes putting the charging system into a second charging state in which the positive charge port switch is open, the negative charge port switch is closed, the first switch is open, the second switch is closed, and the third switch is closed, and controlling the charging system in at least one of:

a buck charging mode by operating the conversion circuit as a buck converter; and a boost discharging mode by operating the conversion circuit as a boost converter.

20. The vehicle system of claim 15, wherein the vehicle includes at least one accessory connected to the propulsion bus in parallel with the inverter and the battery system, and controlling the switching assembly includes connecting the at least one accessory by a fourth switch to the battery system and supply power to the at least one accessory during at least one of the charging and the discharging.

* * * * *